(12) United States Patent
Chapman

(10) Patent No.: US 10,313,556 B1
(45) Date of Patent: Jun. 4, 2019

(54) METHOD AND SYSTEM FOR PRODUCTION QUALITY GLOSS MARKS

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/872,041

(22) Filed: Jan. 16, 2018

(51) Int. Cl.
| | |
|---|---|
| H04N 1/00 | (2006.01) |
| H04N 1/32 | (2006.01) |
| H04N 1/60 | (2006.01) |
| G03G 15/00 | (2006.01) |
| B41M 3/14 | (2006.01) |

(52) U.S. Cl.
CPC .......... H04N 1/32309 (2013.01); B41M 3/14 (2013.01); G03G 15/6585 (2013.01); H04N 1/32325 (2013.01); H04N 1/6097 (2013.01); H04N 1/00883 (2013.01); H04N 2201/0094 (2013.01); H04N 2201/3233 (2013.01); H04N 2201/3271 (2013.01)

(58) Field of Classification Search
None
See application file for complete search history.

(56) References Cited

U.S. PATENT DOCUMENTS

| | | |
|---|---|---|
| 7,639,400 B2 | 12/2009 | Hains |
| 8,311,471 B2 | 11/2012 | Yamada |
| 8,439,403 B2 * | 5/2013 | Kittler, Jr. ............ B41M 7/0027 283/107 |
| 8,730,527 B2 | 5/2014 | Chapman et al. |
| 8,756,212 B2 | 6/2014 | Chipalkatti et al. |
| 9,083,896 B2 | 7/2015 | Chapman |
| 9,614,995 B1 | 4/2017 | Chapman |
| 9,661,186 B1 | 5/2017 | Chapman |
| 9,781,294 B1 | 10/2017 | Chapman |

FOREIGN PATENT DOCUMENTS

JP  01159285 A  *  6/1989

* cited by examiner

*Primary Examiner* — Scott A Rogers
(74) *Attorney, Agent, or Firm* — Loza & Loza LLP; Kermit D. Lopez; Luis M. Ortiz

(57) ABSTRACT

Methods and systems for rendering a gloss mark on a recording medium. Two or more sets of toner channels can be electronically created wherein each toner channel include respective sides and a bottom. The two or more sets of toner channels can be electronically configured to include a reflectance off the sides and the bottom of toner channels wherein one set of the toner channels is positioned at a different height and a different color than the other set of toner channels, thereby enhancing the gloss effect associated with a gloss mark, which allows the gloss mark to be effectively utilized in, for example, a printer or printing system such as an office class rendering device.

20 Claims, 9 Drawing Sheets

METHOD AND SYSTEM FOR PRODUCTION QUALITY GLOSS MARKS

TECHNICAL FIELD

Embodiments are generally related to the field of digital imaging. Embodiments additionally relate to securely printing of digitized documents including digital images. Embodiments further relate to methods, systems, and devices that print gloss marks.

BACKGROUND

In conventional printing processes requiring security measures, a pattern color space having specialty imaging characteristics have been utilized to provide the security measures and prevent counterfeiting of printed materials. In addition, in conventional printing processes, a pattern color space has been utilized, in part on variable data, such as printing logos, serial numbers, seat locations, or other types of unique identifying information on printed materials.

In the area of security printing, documents can be protected from copying, forging, and counterfeiting using multiple techniques. Specialty imaging is one such method of security printing which uses standard material such as paper inks and toners. Typically security-printing companies in the marketplace require special (i.e., and expensive) materials. An example documents is a prescription where a pharmacist would like to be able to have a good level of confidence that the document is genuine.

Examples of conventional specialty imaging techniques are disclosed in U.S. Pat. Nos. 9,661,186; 9,118,870; 8,896,886; 8,310,718; 7,324,241; 7,391,529; 7,092,128; Published US Patent Application Number 2007/0139680; Published US Patent Application Number 2007/0139681; Published US Patent Application Number 2009/0207433; Published US Patent Application Number 2009/0262400; Published US Patent Application Number 2010/0214595; Published US Patent Application Number 2010/0238513; Published US Patent Application Number 201110127331; Published US Patent Application Number 201110191670; Published US Patent Application Number 2011/0205569; Published US Patent Application Number 2012/0140290; and Published US Patent Application Number 2015/0271364.

The entire content of U.S. Pat. No. 9,118,870 is hereby incorporated by reference. The entire content of U.S. Pat. No. 8,310,718 is hereby incorporated by reference. The entire content of U.S. Pat. No. 8,896,886 is hereby incorporated by reference. The entire content of U.S. Pat. No. 7,324,241 is hereby incorporated by reference. The entire content of U.S. Pat. No. 7,391,529 is hereby incorporated by reference. The entire content of U.S. Pat. No. 7,092,128 is hereby incorporated by reference. The entire content of Published US Patent Application Number 200710139680 is hereby incorporated by reference. The entire content of Published US Patent Application Number 2007/0139681 is hereby incorporated by reference. The entire content of Published US Patent Application Number 2009/0207433 is hereby incorporated by reference. The entire content of Published US Patent Application Number 2009/0262400 is also hereby incorporated by reference.

The entire content of Published US Patent Application Number 2010/0214595 is hereby incorporated by reference. The entire content of Published US Patent Application Number 2010/0238513 is hereby incorporated by reference. The entire content of Published US Patent Application Number 2011/0127331 is hereby incorporated by reference. The entire content of Published US Patent Application Number 2011/0191670 is hereby incorporated by reference. The entire content of Published US Patent Application Number 2011/0205569 is hereby incorporated by reference. The entire content of Published US Patent Application Number 201210140290 is hereby incorporated by reference. The entire content of Published US Patent Application Number 2015/0271364 is hereby incorporated by reference.

A Gloss Mark™ (also referred to simply as a gloss mark) is one technique wherein depending upon the light source and an observer's angle, the mark or image appears and disappears. Gloss marks are especially popular with customers because a special tool such as UV light or magnification is not needed to decode.

FIG. 1 illustrates an image 10 having several gloss marks, such as for example, the words or phrase "BOWER CUP." The example image 10 shown in FIG. 1 is an image of a ticket with such gloss marks.

FIG. 2 illustrates an image 20 of a zoomed in character "H" with a background character box surrounding the H having dots in one direction with the foreground "H" has dots in another direction. FIG. 3, on the other hand, shows an image 30 with a gloss mark composed of vector patterns. That is, in the image 30 shown in FIG. 3, zoomed "ABCDE" Gloss Mark™ vector pattern inks are shown. To obtain a good gloss mark on production machines, almost any color can be selected, except lighter colors (e.g., just yellow and the use of a coated media).

A major limitation of such gloss marks is that they only work on very high-end printers such as, for example, an iGen printer with a higher gloss toner. For example, images 42, 44, and 46 are shown in FIG. 4, which are "usable" or offer a "working" gloss effect, but which still have a weaker effect on office devices.

In the various conventional gloss effect specialty imaging techniques identified above, the conventional gloss effect imaging methods, with a few exceptions when utilizing very high end print systems, do not necessarily work well with low gloss toners.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved gloss effect specialty imaging technique, including methods, systems, and devices thereof.

It is another aspect of the disclosed embodiments to provide methods, systems, and devices that enhance the effect of gloss marks so as to allow gloss mark effects to be utilized efficiently for rendering by printers such as, for example, office class printers and multi-function devices.

The aforementioned aspects and other objectives and advantages can now be achieved as described herein. Methods and systems are disclosed for rendering a gloss mark on a recording medium. In one example embodiment, two or more sets of toner channels can be electronically created wherein each toner channel include respective sides and a bottom. The two or more sets of toner channels can be electronically configured to include a reflectance off the sides and the bottom of toner channels wherein one set of the toner channels is positioned at a different height and a different color than the other set of toner channels, thereby enhancing the gloss effect associated with a gloss mark, which allows the gloss mark to be effectively utilized in, for example, an office class rendering device or a multi-function device.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
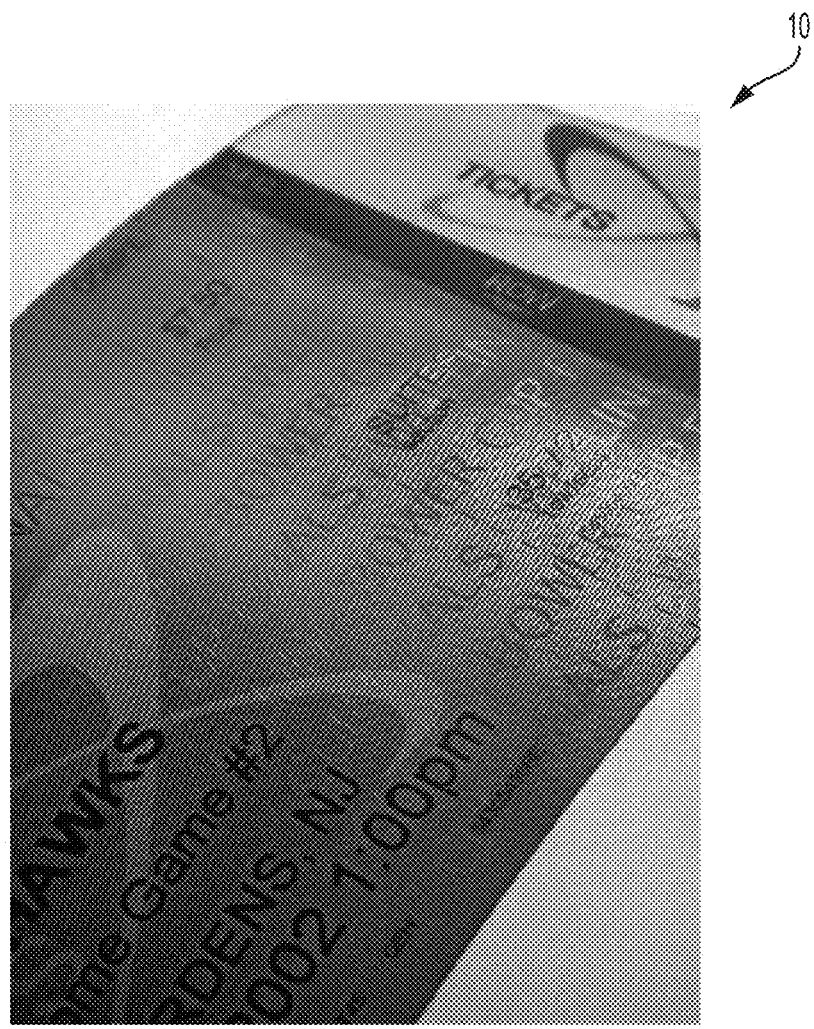
FIG. 1 illustrates an image containing gloss marks.
Figure 2:
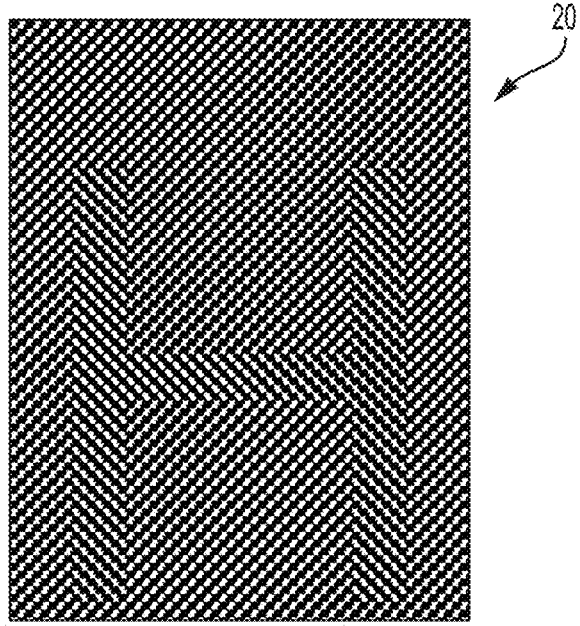
FIG. 2 illustrates an image of a zoomed original gloss mark font letter "H"
Figure 3:
FIG. 3 illustrates an image of zoomed "ABCDE" gloss mark vector pattern inks.
Figure 4:
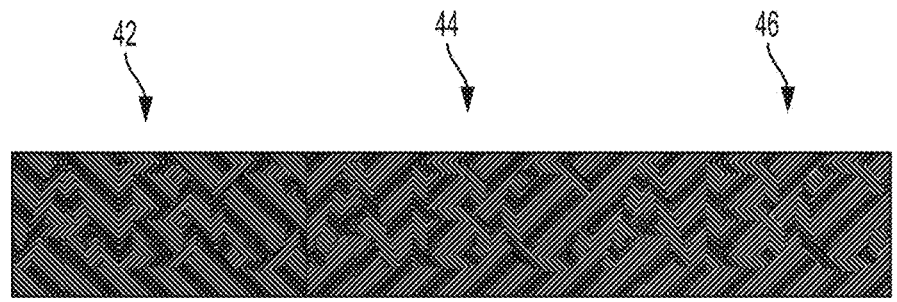
FIG. 4 illustrates images of a working gloss effect, but which offers a weaker effect than on production devices.

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation".

The term "data" refers herein to physical signals that indicate or include information. An "image" as a pattern of physical light or a collection of data representing physical light, may include characters, words, and text as well as other features such as graphics.

A "digital image" is by extension an image represented by a collection of digital data. An image may be divided into "segments," each of which is itself an image. A segment of an image may be of any size up to and including the whole image.

The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation performs "image processing" when it operates on an item of data that relates to part of an image.

"Contrast" is used to denote the visual difference between items, data points, and the like. It can be measured as a color difference or as a luminance difference or both.

A digital color printing system is an apparatus arrangement suited to accepting image data and rendering that image data upon a substrate. Note that as utilized herein the term "rendering" can refer to the finalizing and display of an image. The term "rendering" can also be utilized to refer to the act or process of printing a document by a printing system (i.e., a printer). Thus, a document can be rendered or printed. Rendering may also involve in some situations the display of a document via, for example, a computer display screen. A print job, for example, can be rendered as a hardcopy (e.g., a printed document) or displayed via a computer monitor. One example of a rendering device is, for example, a printer or printing system. Examples of such printers or printing systems include an MFD (Multi-Function Device) or MFP (Multi-Function Product/Printer/Peripheral) and office class rendering devices.

Note that an MFP (Multi-Function Product/Printer/Peripheral), multi-functional, all-in-one (AIO), or Multi-Function Device (MFD) is an office machine that incorporates the functionality of multiple devices in one, so as to have a smaller footprint in a home or small business setting, or to provide centralized document management/distribution/production in a large-office setting. A typical MFP or MFD may act as a combination of some or all of the following devices: printer, scanner, photocopier, fax, email, and so on.

The "RGB color model" is an additive color model in which red, green, and blue light are added together in various ways to reproduce a broad array of colors. The name of the model comes from the initials of the three additive primary colors: red, green, and blue.

The main purpose of the RGB color model is for the sensing, representation, and display of images in electronic systems. RGB is a device-dependent color model: different devices detect or reproduce a given RGB value differently, since the color elements and their response to the individual R, G, and B levels vary from manufacturer to manufacturer, or even in the same device over time. Thus, an RGB value does not define the same color across devices without some kind of color management.

The "CMYK color model" is a subtractive color model, used in color printing, and is also used to describe the printing process itself. CMYK refers to the four inks used in some color printing: cyan, magenta, yellow, and black.

"Colorant" refers to one of the fundamental subtractive C, M, Y, K primaries, which may be realized in formulation as liquid ink, solid ink, dye, or electrostatographic toner. A "colorant mixture" is a particular combination of C, M, Y, K colorants.

An "infrared mark" is a watermark embedded in the image that has the property of being relatively indecipherable under normal light, and yet decipherable under infrared illumination by appropriate infrared sensing devices, such as infrared cameras.

"Metameric" rendering/printing is the ability to use multiple colorant combinations to render a single visual color, as can be achieved when printing with more than three colorants.

The disclosed embodiments generally relate to a system, method, and device that can increase the effect of a gloss mark using multi-layer overprinting. Note that the term "overprinting" as utilized herein relates to a process of rendering or printing one color on top of another color. Overprinting also refers sometimes to the creation of a rich black (e.g., regarded as "blacker than black") by printing black over another dark color. The term "overprint", which is the result of overprinting, can relate to the printing of additional material or another color on a form or a sheet previously printed.

As will be discussed in greater detail herein, an overprint can be used, for example, three times to create four layers, wherein the second and fourth layers can provide the gloss effect for a foreground image (i.e., placed using the third layer) on a background image (i.e., placed using first/primary printing) layer. A benefit of this approach is the ability to migrate gloss mark functionality to office machines from current production only machines.

Figure 5:
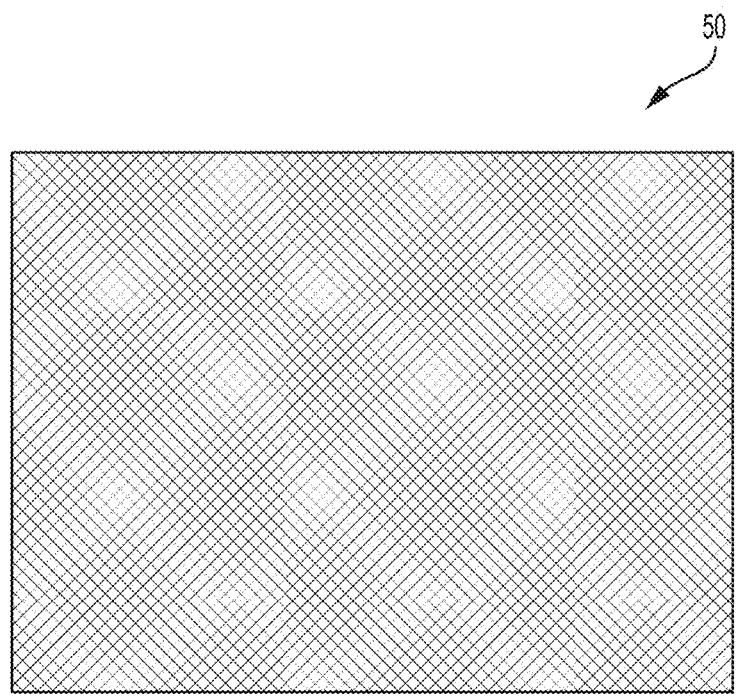
FIG. 5 illustrates an example image created having a solid color background, in accordance with an example embodiment.
Figure 6:
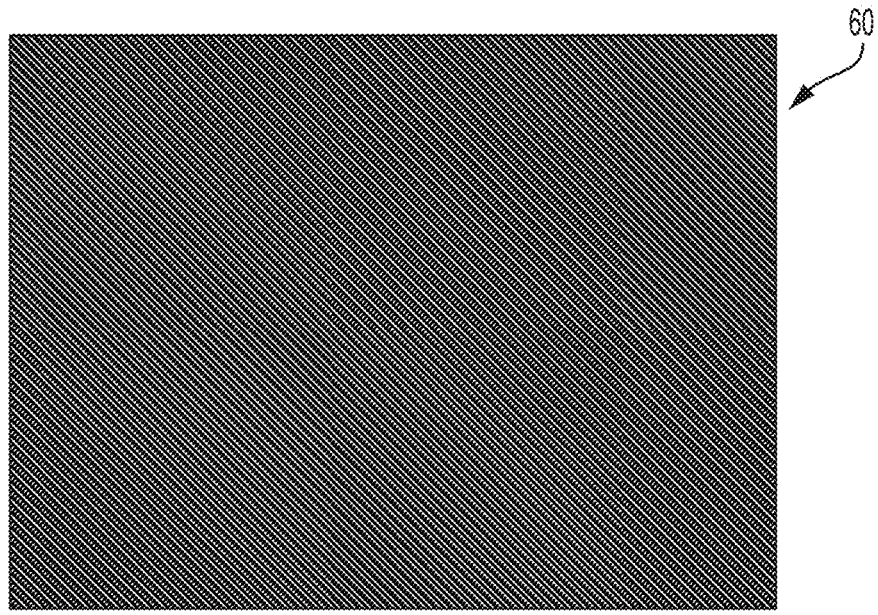
FIG. 6 illustrates an image based on a selection of a different solid color that an overprint step supports and in which a background gloss ink is placed on top of a background, in accordance with an example embodiment.

The gloss marks' effect can be enhanced by the creation of two sets of toner channels with reflectance off the sides and bottom of these channels. One set of toner channels is both at a different height and color than the other. This can move the gloss effect of gloss marks into the production class on higher end printing devices and machines. In general, the following steps can be implemented to achieve rendering of gloss marks on a recording medium through a production class rendering device:

1) Overprint set to true
2) Continuous tone set to true
3) Create a solid color background, e.g., 100% cyan
4) Select a different solid color that overprint supports, e.g., 100% black
5) Place the background gloss ink on top of the background
6) Select a different solid color that overprint supports (e.g., yellow)
7) Write the foreground with the color in the prior step
8) Place the foreground gloss ink on top of the foreground with the same color as step 4
9) Print on glossy media FIG. 5 shows an image 50 based on the operation of step 3 above, wherein a solid color background (e.g., 100% cyan) is created. FIG. 6 illustrates an image 60 based on steps 4 and 5 above.

Figure 7:
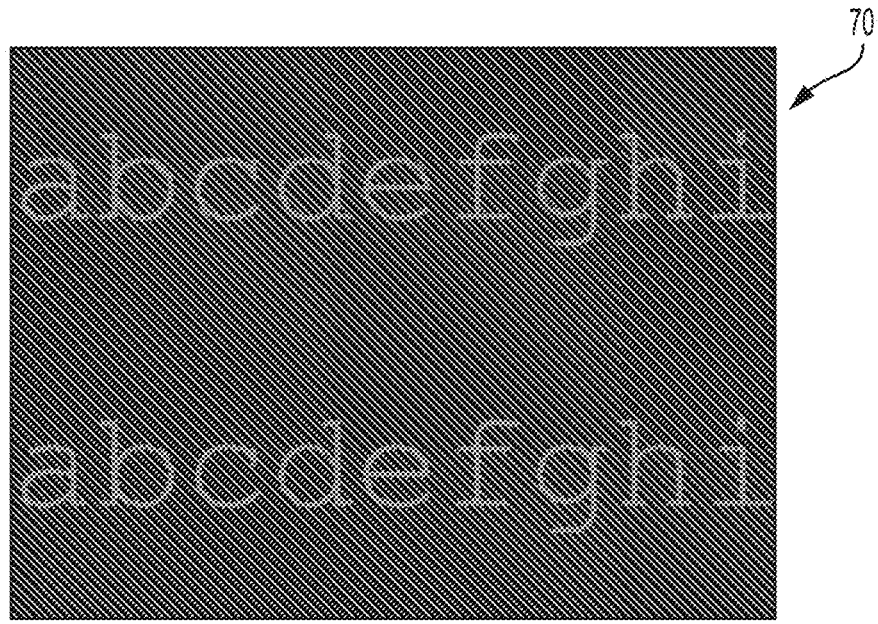
FIG. 7 illustrates an image selected with a different solid color that an overprint supports, and in which the foreground is written with the color selected from the operation discussed herein with respect to FIG. 6, in accordance with an example embodiment.

FIG. 7 illustrates an image 70 based on steps 6 and 7 above, where yellow and cyan are green with the overprint is true. For example, in step 6, an operation is implemented to select a different solid color that overprint supports (e.g., yellow) and step 7 Implements an operation to write the foreground with the color in the prior step. In FIG. 7, two gloss marks are shown in the image 70 as "abcdefghi".

Figure 8:
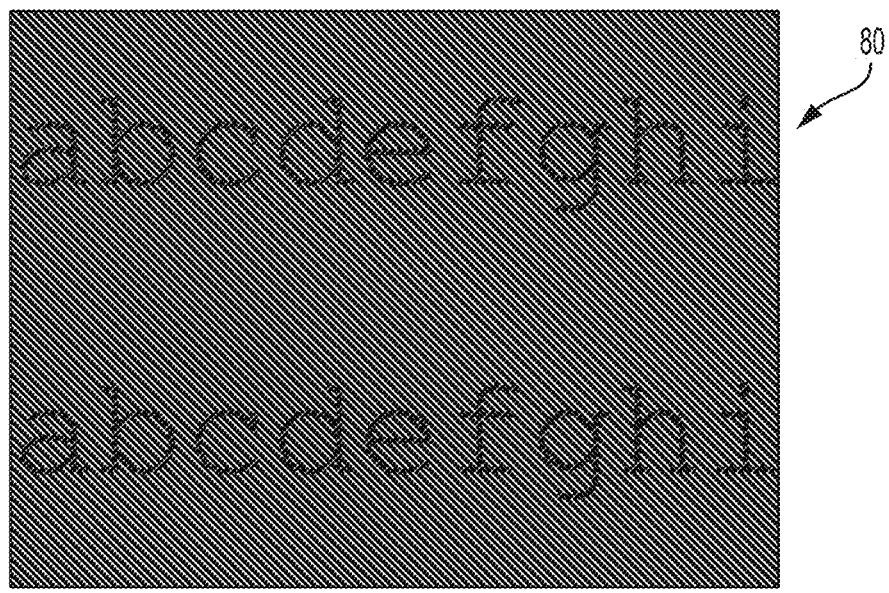
FIG. 8 illustrates an image in which the foreground gloss ink is placed on top of the foreground with the same color with respect to FIG. 7, in accordance with an example embodiment.
Figure 9:
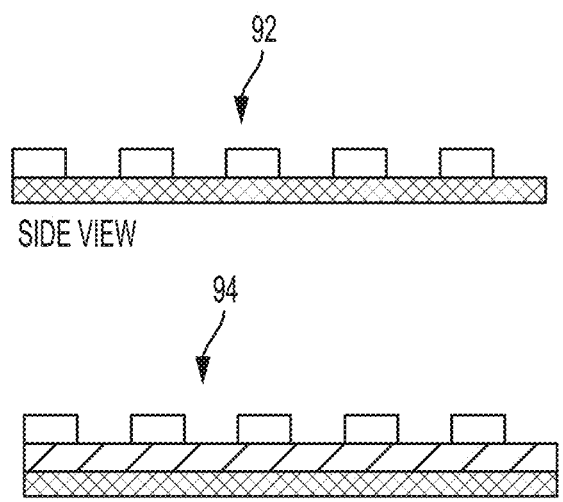
FIG. 9 illustrates side view examples in which magenta is used in place of cyan, in accordance with an example embodiment.
Figure 10:
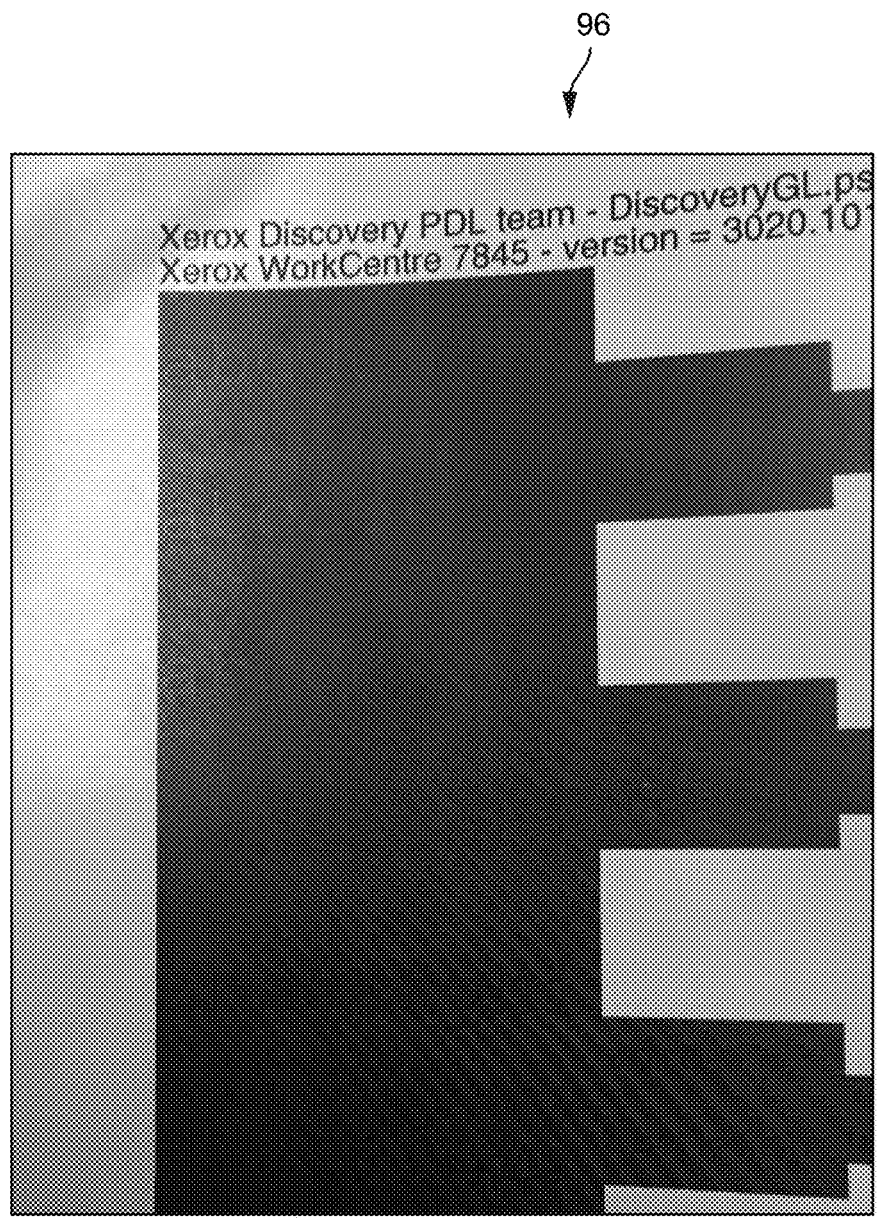
FIG. 10 illustrates an image 96 showing the final gloss effect, in accordance with an example embodiment.

FIG. 8 shows an image 80 based on step 8 above, wherein an operation is implemented to place the foreground gloss ink on top of the foreground with the same color as step 4. The image 80 contains the two gloss marks "abcdefghi" as in the FIG. 7 image. However, as shown in FIG. 8, the two gloss marks "abcdefghi" can be difficult to see. FIG. 9 shows two side views 92 and 94 in which magenta is used in place of cyan. In this case, the color that was green in FIG. 8 is now red. FIG. 10 illustrates an image 96 showing the final gloss effect, in accordance with an example embodiment.

Figure 11:
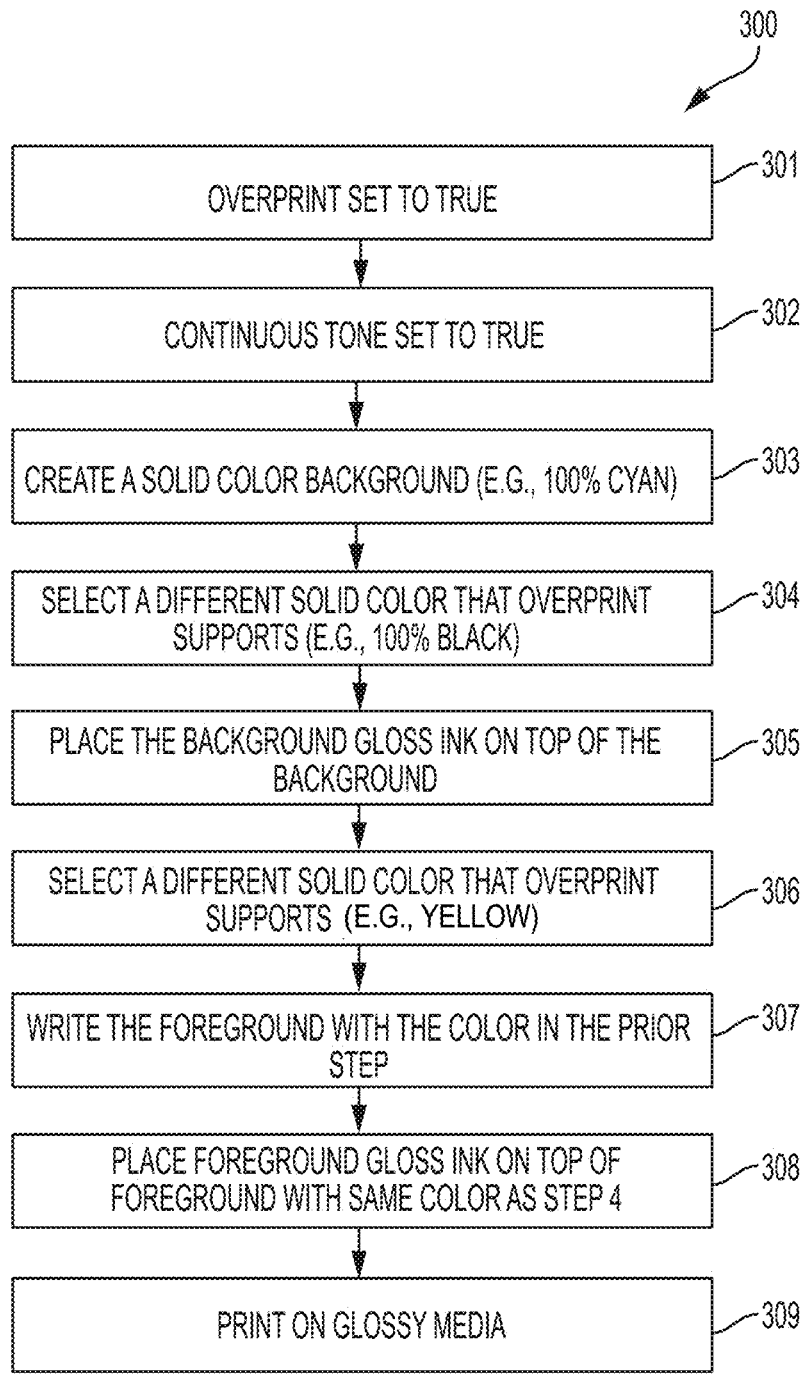
FIG. 11 illustrates a flow chart of operations depicting logical operational steps of a method for rendering a gloss mark on a recording medium through a production class rendering device, in accordance with an example embodiment.

FIG. 11 illustrates a flow chart of operations depicting logical operational steps of a method 300 for rendering a gloss mark on a recording medium through a production class-rendering device, in accordance with an example embodiment. The method 300 depicted in FIG. 11 covers the steps 1-9 discussed previously. Thus, as indicated at block 301 (Step 1), an operation can be implemented in which the overprint is set to true. Thereafter, as shown at block 302 (Step 2), an operation is implemented in which a continuous tone is set to true.

Then, as depicted at block 303 (Step 3), an operation is implemented in which a solid color background is electronically created. Next, as indicated at block 304 (Step 4), an operation can be implemented to select a different solid color that the overprint supports. Thereafter, as described at block 305, an operation can be implemented to place the background gloss ink on top of the background. Then, as shown at block 306, an operation can be implemented to select a different solid color that the overprint supports.

As indicated next at block 307, an operation can be implemented to write the foreground with the color in the prior step (i.e., the operation of block 306 or Step 6). Thereafter, as depicted at block 308, an operation can be implemented to place the foreground gloss ink on top of the foreground with the color as in Step 4 (i.e., the operation shown at block 304). Finally, an operation can be implemented as shown at block 309 (Step 9) to print on gloss media (e.g., see FIG. 10 for an example of such a glossy rendering).

Figure 12:
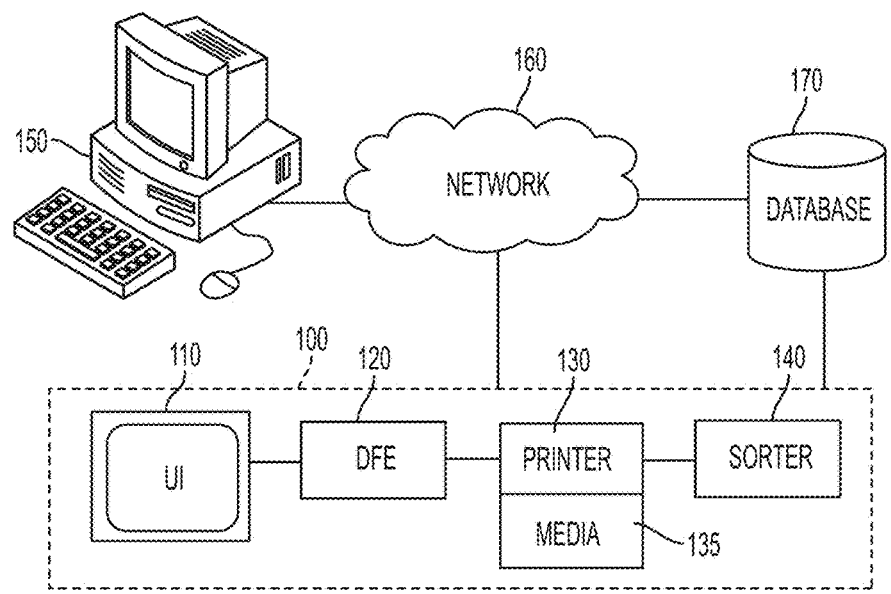
FIG. 12 illustrates a block diagram of a printing system suitable for implementing one or more aspects of the exemplary methods described herein.

FIG. 12 illustrates a printing system (or image rendering system) 100 suitable for implementing various aspects of the exemplary embodiments described herein. Note that as utilized herein, the word "printer" and the term "printing system" can encompass any apparatus and/or system, such as a digital copier, xerographic and reprographic printing systems, bookmaking machine, facsimile machine, multi-function machine, ink-jet machine, continuous feed, sheet-fed printing device, etc., which may contain a print controller and a print engine and which may perform a print outputting function for any purpose.

The printing system 100 generally includes a user interface 110, a digital front-end controller 120, and at least one print engine 130. The print engine 130 has access to print media 135 of various sizes and cost for a print job. A "print job" or "document" is normally a set of related sheets, usually one or more collated copy sets copied from a set of original print job sheets or electronic document page images, from a particular user, or otherwise related. For submission of a regular print job (or customer job), digital data is generally sent to the printing system 100.

A sorter 140 operates after the print engine 130 to manage arrangement of the hard copy output, including cutting functions, prints a job. A user can access and operate the printing system 100 using the user interface 110 or via a workstation 150. The workstation 150 communicates with the printing system 100 via a communications network 160.

A user profile, a work product for printing, a media library, and various print job parameters can be stored in a database or memory 170 accessible by the workstation 150 or the printing system 100 via the network 160, or such data can be directly accessed via the printing system 100. One or more color sensors (not shown) may be embedded in the printer paper path, as known in the art.

Figure 13:
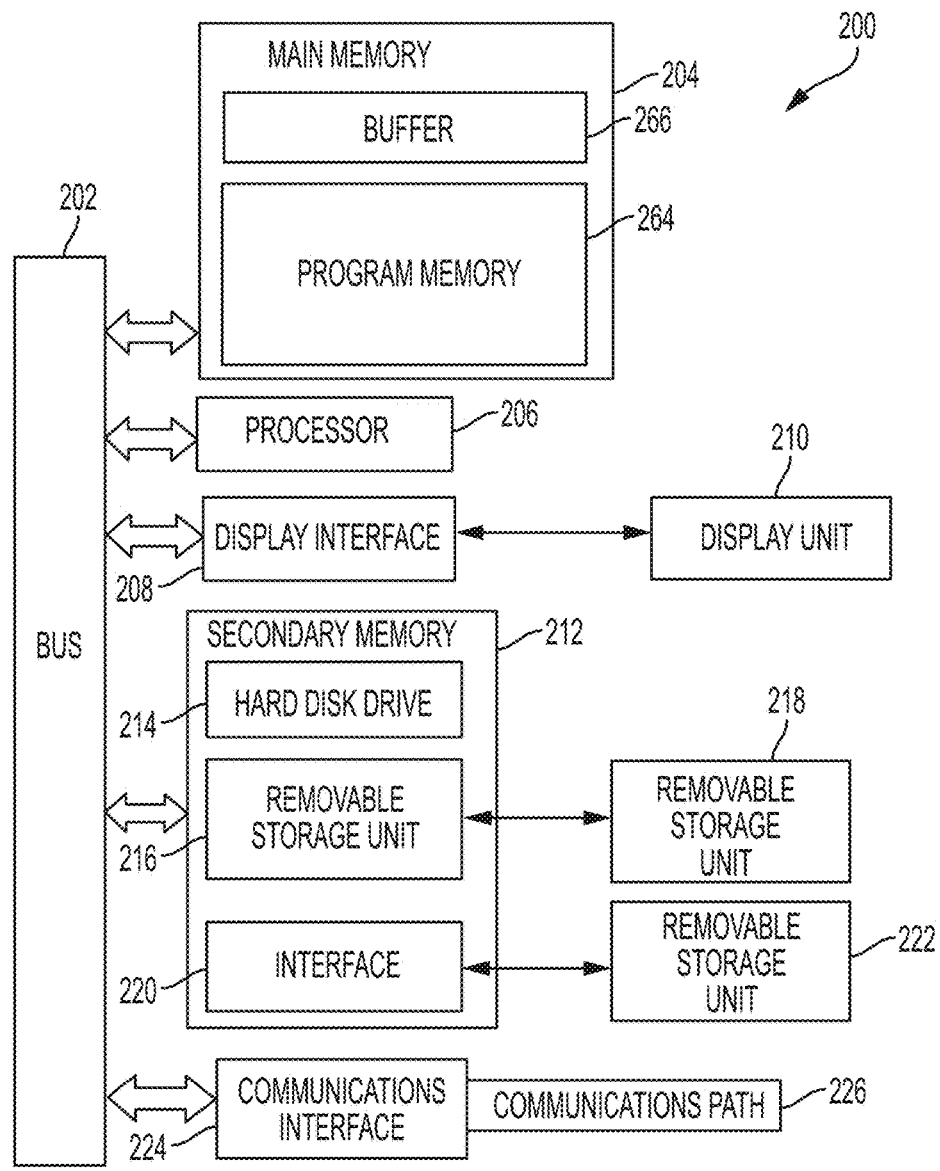
FIG. 13 illustrates a block diagram of digital front-end controller useful for implementing one or more aspects of the exemplary methods described herein.

With respect to FIG. 13, an exemplary digital front-end controller 200 is shown in greater detail. The digital front end 200 includes one or more processors, such as processor 206 capable of executing machine executable program instructions.

In the embodiment shown, the processor is in communication with a bus 202 (e.g., a backplane interface bus, cross-over bar, or data network). The digital front end 200 also includes a main memory 204 that is used to store machine-readable instructions. The main memory also being capable of storing data. Main memory may alternatively include random access memory (RAM) to support reprogramming and flexible data storage. Buffer 266 is used to temporarily store data for access by the processor.

Program memory 264 includes, for example, executable programs that implement the embodiments of the methods described herein. The program memory 264 can store at least a subset of the data contained in the buffer.

The digital front end 200 includes a display interface 208 that forwards data from communication bus 202 (or from a frame buffer not shown) to a display 210. The digital front end 200 also includes a secondary memory 212 which includes, for example, a hard disk drive 214 and/or a removable storage drive 216, which reads and writes to removable storage 218, such as a floppy disk, magnetic tape, optical disk, etc., that stores computer software and/or data.

The secondary memory 212 alternatively includes other similar mechanisms for allowing computer programs or other instructions to be loaded into the computer system. Such mechanisms include, for example, a removable storage unit 222 adapted to exchange data through interface 220.

Examples of such mechanisms include a program cartridge and cartridge interface (such as that found in video game devices), a removable memory chip (such as an EPROM or PROM) and associated socket, and other removable units and interfaces, which allow software and data to be transferred.

The digital front end 200 can include a communications interface 224, which acts as both an input and an output to allow software and data to be transferred between the digital front end 200 and external devices. Examples of a communications interface include a modem, a network interface (such as an Ethernet card), a communications port, a PCM-CIA slot and card, etc.

Computer programs (also called computer control logic) may be stored in main memory 204 and/or secondary memory 212. Computer programs may also be received via a communications interface 224. Such computer programs, when executed, enable the computer system to perform the features and capabilities provided herein such as, for example, the instructions, operations, or steps shown at blocks 301-309 of method 300 depicted in FIG. 11 and elsewhere herein. Software and data transferred via the communications interface can be in the form of signals which may be, for example, electronic, electromagnetic, optical, or other signals capable of being received by a communications interface.

These signals are provided to a communications interface via a communications path (i.e., channel), which carries signals and may be implemented using wire, cable, fiber optic, phone line, cellular link, RF, or other communications channels. Part of the data generally stored in secondary memory 212 for access during digital front-end operation is a set of translation tables that convert an incoming color signal into a physical machine signal. This color signal can be expressed either as a colorimetric value, usually three components as L*a*b*, RGB, XYZ, etc., into physical exposure signals for the four toners cyan, magenta, yellow, and black. These tables are commonly created outside of the digital front end and downloaded, but are optionally created inside the digital front end in a so-called characterization.

The claims, description, and drawings of this application may describe one or more of the instant technologies in operational/functional language, for example, as a set of operations to be performed by a computer. Such operational/functional description in most instances can be specifically-configured hardware (e.g., because a general purpose computer in effect becomes a special-purpose computer once it is programmed to perform particular functions pursuant to instructions from program software). Note that the data-processing systems and devices discussed herein may be implemented as special-purpose computer in some example embodiments. In some example embodiments, such data-processing systems can be programmed to perform the aforementioned particular instructions thereby becoming in effect a special-purpose computer. In some situations, a printing device or printing system may be a special-purpose computer. Thus, the system 200 shown in FIG. 13 may be in some example embodiments a special purpose computer. Similarly, in some example embodiments, the system 100 shown in FIG. 12 may be a special-purpose computer.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations. The disclosed embodiments actually improve the underlying technology by offering efficiencies in, for example, rendering and printing.

The logical operations/functions described herein can be a distillation of machine specifications or other physical mechanisms specified by the operations/functions such that the otherwise inscrutable machine specifications may be comprehensible to the human mind. The distillation also allows one skilled in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions are representative of static or sequenced specifications of various hardware elements. This is true because tools available to implement technical disclosures set forth in operational/functional formats-tools in the form of a high-level programming language (e.g., C, Java, Visual Basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, what is termed "software" is shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. In order to facilitate human comprehension, in many instances, high-level programming languages resemble or even share symbols with natural languages.

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies), this is not true.

The fact that high-level programming languages use strong abstraction to facilitate human understanding should not be taken as an indication that what is expressed and claimed herein is an abstract idea. To be clear, the disclosed embodiments and claimed subject matter are not directed to an abstract idea. In an example embodiment, if a high-level programming language is the tool used to implement a technical disclosure in the form of functions/operations, it can be understood that, far from being abstract, imprecise, "fuzzy," or "mental" in any significant semantic sense, such a tool is instead a near incomprehensibly precise sequential specification of specific computational—machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory devices, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors).

The logic circuits forming the microprocessor are arranged to provide a micro architecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output.

The Instruction Set Architecture includes a specification of the machine language that can be used by programmers to use/control the microprocessor. Since the machine language instructions are such that they may be executed directly by the microprocessor, typically they consist of strings of binary digits or bits. For example, a typical machine language instruction might be many bits long (e.g., 32, 64, or 128 bit strings are currently common). A typical machine language instruction might take the form "11110000101011110000111100111111" (e.g., a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification, which selects out hardware logic gates, specifies voltage levels, voltage transition timings, etc., such that the humanly useful work is accomplished by the hardware.

Thus, a functional/operational technical description, when viewed by one skilled in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. Accordingly, any such operational/functional technical descriptions may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object, which has a stable, measurable, and changeable state may be used to construct a machine based on the above technical description. Charles Babbage, for example, constructed the first computer out of wood and powered by cranking a handle.

Thus, far from being understood as an abstract idea, it can be recognized that a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc., with natural language simply cannot be taken as an indication that such functional/operational technical descriptions are abstract ideas, or mere expressions of abstract ideas. In fact, as outlined herein, in the technological arts this is simply not true. When viewed through the tools available to those skilled in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person skilled in the art in understanding the described subject matter by providing a description that is more or less independent of any specific vendor's piece(s) of hardware.

The use of functional/operational technical descriptions assists the person skilled in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person skilled in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those skilled in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one skilled in the art can readily understand and apply in a manner independent of a specific vendor's hardware implementation.

At least a portion of the devices or processes described herein can be integrated into an information processing system. An information processing system generally includes one or more of a system unit housing, a video display device, memory, such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), or control systems including feedback loops and control motors (e.g., feedback for detecting position or velocity, control motors for moving or adjusting components or quantities). An information processing system can be implemented utilizing suitable commercially available components, such as those typically found in data computing/communication or network computing/communication systems.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes or systems or other technologies described herein can be effected (e.g., hardware, software, firmware, etc., in one or more machines or articles of manufacture), and that the preferred vehicle will vary with the context in which the processes, systems, other technologies, etc., are deployed. For example, if an implementer determines that speed and accuracy are paramount, the implementer may opt for a mainly hardware or firmware vehicle; alternatively, if flexibility is paramount, the implementer may opt for a mainly software implementation that is implemented in one or more machines or articles of manufacture; or, yet again alternatively, the implementer may opt for some combination of hardware, software, firmware, etc., in one or more machines or articles of manufacture. Hence, there are several possible vehicles by which the processes, devices, other technologies, etc., described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. In an embodiment, optical aspects of implementations will typically employ optically-oriented hardware, software, firmware, etc., in one or more machines or articles of manufacture.

The herein described subject matter sometimes illustrates different components contained within, or connected with, different other components. It is to be understood that such depicted architectures are merely examples, and that in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably coupleable" to each other to achieve the desired functionality. Specific examples of operably coupleable include, but are not limited to, physically mateable, physically interacting components, wirelessly interactable, wirelessly interacting components, logically interacting, logically interactable components, etc.

In an example embodiment, one or more components may be referred to herein as "configured to," "configurable to," "operable/operative to," "adapted/adaptable," "able to," "conformable/conformed to," etc. Such terms (e.g., "configured to") can generally encompass active-state components, or inactive-state components, or standby-state components, unless context requires otherwise.

The foregoing detailed description has set forth various embodiments of the devices or processes via the use of block diagrams, flowcharts, or examples. Insofar as such block diagrams, flowcharts, or examples contain one or more functions or operations, it will be understood by the reader that each function or operation within such block diagrams, flowcharts, or examples can be implemented, individually or collectively, by a wide range of hardware, software, firmware in one or more machines or articles of manufacture, or virtually any combination thereof. Further, the use of "Start," "End," or "Stop" blocks in the block diagrams is not intended to indicate a limitation on the beginning or end of any functions in the diagram. Such flowcharts or diagrams may be incorporated into other flowcharts or diagrams where additional functions are performed before or after the functions shown in the diagrams of this application. In an embodiment, several portions of the subject matter described herein is implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and/or firmware would be well within the skill of one skilled in the art in light of this disclosure. In addition, the mechanisms of the subject matter described herein are capable of being distributed as a program product in a variety of forms, and that an illustrative embodiment of the subject matter described herein applies regardless of the particular type of signal-bearing medium used to actually carry out the distribution. Non-limiting examples of a signal-bearing medium include the following: a recordable type medium such as a floppy disk, a hard disk drive, a Compact Disc (CD), a Digital Video Disk (DVD), a digital tape, a computer memory, etc.; and a transmission type medium such as a digital or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to the reader that, based upon the teachings herein, changes and modifications can be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of the convention (e.g., "a system having at least one of A, B, or C" would include but not be limited to systems that have A alone, B alone, C alone, A and B together, A and C together, B and C together, and/or A, B, and C together, etc.). Typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of 'A' or "B" or "A and B."

With respect to the appended claims, the operations recited therein generally may be performed in any order. Also, although various operational flows are presented in a sequence(s), it should be understood that the various operations may be performed in orders other than those that are illustrated, or may be performed concurrently. Examples of such alternate orderings include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Based on the foregoing, it can be appreciated that a number of example preferred and alternative embodiments are disclosed herein. For example, in an example preferred embodiment, a method for rendering a gloss mark on a recording medium can be implemented. Such a method can include steps or operations such as, for example, electronically creating two or more sets of toner channels, wherein each set of toner channels among the two or more sets of toner channels includes respective sides and a bottom; and electronically configuring the two or more sets of toner channels to include a reflectance off the sides and the bottom, wherein one set of toner channels is positioned at a different height and a different color than another set of toner channels, thereby enhancing the gloss effect associated with the gloss mark.

In some example embodiments, the aforementioned different color can comprise a different solid cover supported by an overprint. In still another example embodiment, a step or operation can be provided for selecting the different color. In yet another example embodiment, a step or operation can be provided for writing a foreground with the different color. In still another example embodiment, a step or operation can be provided for placing foreground gloss ink on top of the foreground. In some example embodiments, the aforementioned recording medium can be glossy media. In another example embodiment, a step or operation can be provided for rendering the gloss mark on the glossy media with the two or more sets of toner channels.

In another example embodiment, a system for rendering a gloss mark on a recording medium can be implemented. Such a system can include, for example, at least one processor, and a non-transitory computer-usable medium embodying computer program code, the computer-usable medium capable of communicating with the at least one processor. The computer program code can include steps, operations, or instructions executable by the processor (or processors) and configured for electronically creating at least two sets of toner channels, wherein each toner channel among the sets of toner channels includes respective sides and a bottom; and electronically configuring the sets of toner channels to include a reflectance off the sides and the bottom, wherein one set of the two or more sets of toner channels is positioned at a different height and a different color than another set, thereby enhancing the gloss effect associated with the gloss mark.

In another example embodiment, a non-transitory processor-readable medium can be implemented, which stores computer code representing instructions to cause a process for rendering a gloss mark on a recording medium. The computer code can include code to, for example: electronically create two or more sets of toner channels, wherein each toner channel among the two or more sets of toner channels includes respective sides and a bottom; and electronically configure the two or more sets of toner channels to include a reflectance off the sides and the bottom of the two or more sets of toner channels, wherein one set is positioned at a different height and a different color than another set, thereby enhancing the gloss effect associated with the gloss mark.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering a gloss mark on a recording medium, said method comprising:
    electronically creating at least two sets of toner channels, wherein each toner channel among the at least two sets of toner channels includes respective sides and a bottom; and
    electronically configuring said at least two sets of toner channels to include a reflectance off said sides and said bottom of said at least two sets of toner channels, wherein one set of said at least two sets of toner channels is positioned at a different height and a different color than another set of said at least two sets of toner channels, thereby enhancing a gloss effect associated with a gloss mark.

2. The method of claim 1 wherein said different color comprises a different solid cover supported by an overprint.

3. The method of claim 2 further comprising selecting said different color.

4. The method of claim 2 further comprising writing a foreground with said different color.

5. The method of claim 4 further comprising placing a foreground gloss ink on top of said foreground.

6. The method of claim 1 wherein said recording medium comprises glossy media.

7. The method of claim 6 further comprising rendering said gloss mark on said glossy media with said at least two sets of toner channels.

8. A system for rendering a gloss mark on a recording medium, said system comprising:
    at least one processor, and
    a non-transitory computer-usable medium embodying computer program code, said computer-usable medium capable of communicating with said at least one processor, said computer program code comprising instructions executable by said at least one processor and configured for:
        electronically creating at least two sets of toner channels, wherein each toner channel among said at least two sets of toner channels includes respective sides and a bottom; and
        electronically configuring said at least two sets of toner channels to include a reflectance off said sides and said bottom of said at least two sets of toner channels, wherein one set of said at least two sets of toner channels is positioned at a different height and a different color than another set of said at least two sets of toner channels, thereby enhancing a gloss effect associated with a gloss mark.

9. The system of claim 8 wherein said different color comprises a different solid cover supported by an overprint.

10. The system of claim 9 further comprising selecting said different color.

11. The system of claim 9 further comprising writing a foreground with said different color.

12. The system of claim 11 further comprising placing a foreground gloss ink on top of said foreground.

13. The system of claim 8 wherein said recording medium comprises glossy media.

14. The system of claim 13 further comprising rendering said gloss mark on said glossy media with said at least two sets of toner channels.

15. A non-transitory processor-readable medium storing computer code representing instructions to cause a process for rendering a gloss mark on a recording medium, said computer code including code to:
    electronically create at least two sets of toner channels, wherein each toner channel among said at least two sets of toner channels includes respective sides and a bottom; and
    electronically configure said at least two sets of toner channels to include a reflectance off said sides and said bottom of said at least two sets of toner channels, wherein one set of said at least two sets of toner channels is positioned at a different height and a different color than another set of said at least two sets of toner channels, thereby enhancing a gloss effect associated with a gloss mark.

16. The processor-readable medium of claim 15 wherein said different color comprises a different solid cover supported by an overprint.

17. The processor-readable medium of claim 16 further comprising selecting said different color.

18. The processor-readable medium of claim 16 further comprising writing a foreground with said different color.

19. The processor-readable medium of claim 18 further comprising placing a foreground gloss ink on top of said foreground.

20. The processor-readable medium of claim 19 further comprising rendering said gloss mark on glossy media with said at least two sets of toner channels.

* * * * *